Jan. 12, 1932. C. C. CALKINS 1,840,617
JOURNAL BEARING
Filed Dec. 15, 1930 2 Sheets-Sheet 1
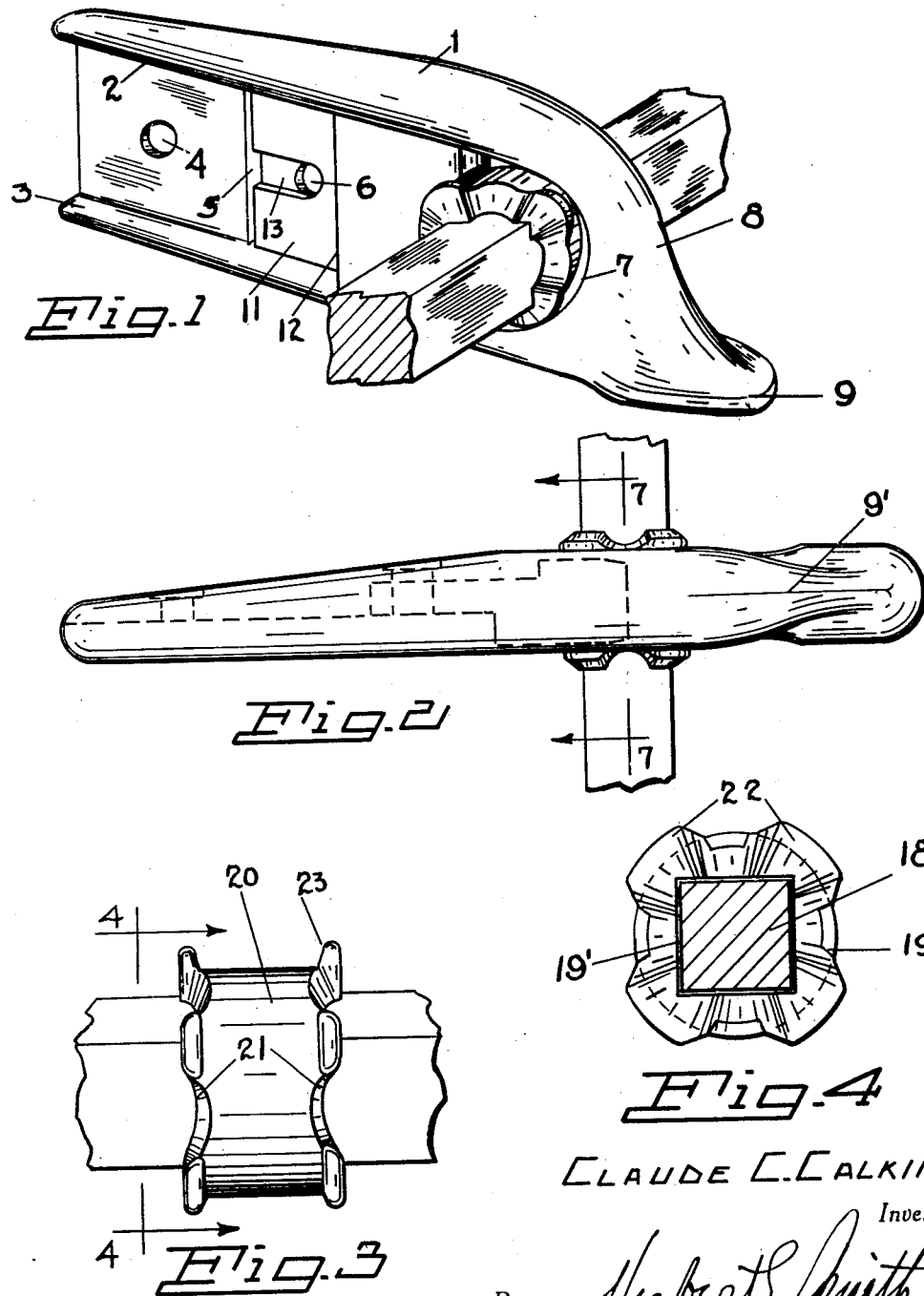
CLAUDE C. CALKINS
Inventor
By Herbert E. Smith
Attorney Jan. 12, 1932.  C. C. CALKINS  1,840,617
JOURNAL BEARING
Filed Dec. 15, 1930    2 Sheets-Sheet 2
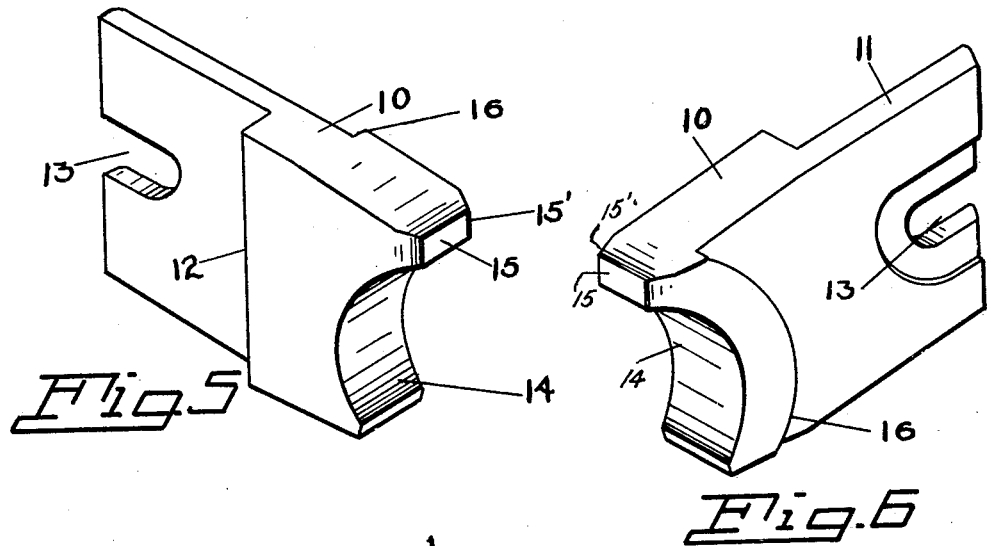
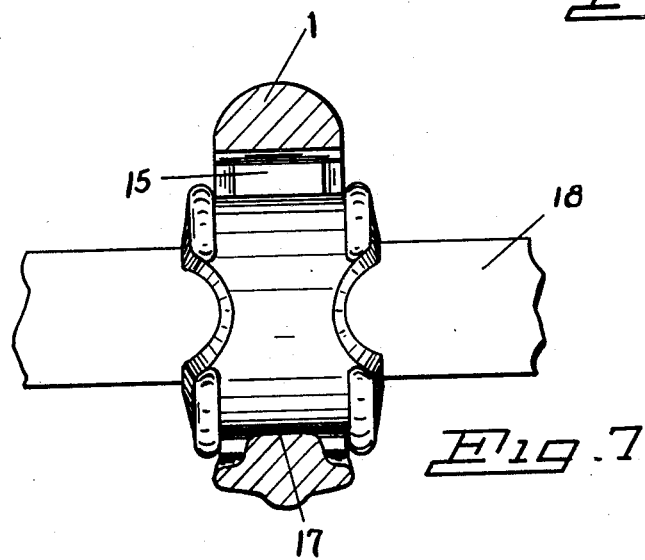
CLAUDE C. CALKINS
*Inventor*
By  *Herbert E. Smith*
*Attorney*

Patented Jan. 12, 1932

1,840,617

UNITED STATES PATENT OFFICE

CLAUDE C. CALKINS, OF SPOKANE, WASHINGTON

JOURNAL BEARING

Application filed December 15, 1930. Serial No. 502,431.

My present invention relates to improvements in journal bearings for rotary rod weeders, or agricultural implements, usually traction operated and having sub-soil rotary rods, angular in cross section and which are forced broadside through the soil as they rotate or revolve anti-clockwise or in direction reverse to the travel of the implement wheels that drive the rotary rod. As the rods travel through the sub-soil they uproot weeds and other plant-growth and lay the uprooted plants upon the surface of the soil, and also cultivate the soil by loosening and turning over the material. The angular rod, usually square in cross section, is supported from the main frame of the implement by means of a number of longitudinally extending beams or goose-necks, laterally spaced at intervals, and each provided with a bearing shoe in which the journal bearing for the squared rotary rod is mounted.

The bearing shoes and the rod are forced through the sub-soil, and to insure a maximum efficiency in the performance of the functions of the weeder-rod, a minimum of resistance must be encountered by both the rod and its bearings, as well as the shoes, to permit easy travel of the sub-soil parts.

In actual practice, the bearings for the rotary rod, as they travel through the sub-soil, become clogged with soil, and as a result excessive friction is created in the bearings; the journal members are subjected to excessive wear and in many instances the members are broken, thus requiring frequent repairs, replacements, and adjustments with consequent loss of time and labor, together with expense for repairs or replacements.

By the ultilization of the journal bearings of my invention in combination with the rotary rod and shoes of the implement, a minimum area of obstruction or resistance is presented in the sub-soil as the implement advances, and therefore the progress of the implement is not excessively impeded, and due to this minimum area of resistance or obstruction an excessive turbulence of the soil is avoided. In carrying out my invention, admission of soil to the bearings of the journals of the rod is materially reduced, and means are provided for automatically ridding the journal bearings of soil that may find entrance to the bearings. The friction created in the bearings is thus decreased and the durability of the bearings is enhanced, thus avoiding frequent repairs, replacements and adjustments of the bearings. Lateral displacement of the bearing members is also prevented, and in general the cost of manufacturing and assembling the parts of the implement is reduced, and facility is attained in assembling and in dismantling the parts.

The invention consists in certain novel combinations and arrangements of parts involving the related shoe, journal bearing, and rotary rod, as will hereinafter be more fully set forth and claimed. In the accompanying drawings I have illustrated one complete example of the physical embodiment of my invention wherein the parts are combined and arranged according to one mode I have thus far devised for the practical application of the principles of my invention.

Figure 1 is a perspective view of one of the bearing shoes, showing a portion of the square weeder rod and its bearing at the forward part of the shoe.

Figure 2 is a top plan view of the parts in Figure 1.

Figure 3 is a detail face view of one of the journal bushings in its place on the rotary rod, showing particularly the retaining lugs, and the lateral beveled edges that aid in ridding the journal bearing of soil accumulations.

Figure 4 is a sectional detail view at line 4—4 of Figure 3, showing the loose fit of the bearing bushing or collar on the square rod.

Figure 5 is a detail perspective view of the intermediate, removable section of the shoe, and Figure 6 is a similar view of this section from the reverse side.

Figure 7 is a sectional detail view of the bearing shoe at line 7—7 of Figure 2, showing a bushing or spool therein.

One of the shoes 1, detached from the gooseneck or beam of the implement is shown in Figures 1 and 2 as provided with upper and lower side flanges 2 and 3 and a transverse bolt hole 4, the flanges forming a socket for the reception of the front end of the beam and the bolt hole adapted to receive one of the attaching bolts for fastening the shoe on the beam. The recess formed by the flanges is countersunk at 5, and a second bolt 6 is provided in the wall of the countersunk socket to receive a second attaching bolt.

In front of the countersunk socket, the shoe is formed with a transverse opening, and the front wall 7 of this opening is rounded or curved and fashioned with a bearing bead 17, which, as seen in Figure 7 is narrower than the shoe. The shoe is formed with an exterior rounded nose 8 that merges with a forwardly projecting, horizontally extending, lip 9, below the bearing portion of the shoe, and the face of the shoe, formed on a compound curve tends to hold the shoe in the sub-soil as it advances.

A removable, intermediate section 10 of the shoe is shown in Figures 5 and 6 having a reduced flange 11 that fits into the countersunk socket 5 of the shoe, and the forward end of the supporting beam abuts against a shoulder 12 of this section. The section 10 has in the flange 11 an open slot 13 complementary to the bolt hole 6 of the shoe, and the forward end of the beam overlaps this slotted flange 11 to retain the removable section in place. The shoe is attached to the beam by means of bolts passed through the beam and through holes 4 and 6 and slot 13 of the shoe.

At the forward end of the removable section 10 of the shoe is formed a rounded bearing surface 14 complementary to the bearing rib or bead 17 of the shoe, but the rounded bearing face 14 is wider than the bead, the face 14 being the full width of the shoe. The bearing face 14 forms a rear bearing face while the bead 17 forms the complementary bearing face or wall of the transverse opening in the forward part of the shoe.

The rounded bearing face 14 of the section 10 terminates in an upper lug 15 that is beveled or tapered at its sides 15' thus reducing the face of the lug to approximately the width of the bearing bead 17.

The bearing face 14, being at the rear of the bearing, receives the thrust imposed on the rod 18 and the thrust or pressure is transmitted to the shoe by the rounded shoulder 16 of the section, and to the beam by the upright shoulder 12 of the section.

On the square rod 18 a number of bushings 19 are slipped and each bushing has a central, square opening 19' preferably larger in area than the cross section of the rod in order that the bushings may easily be slipped on the rod, and there loosely retained.

The bushing of course revolves with the rod, and the former has an annular, exterior bearing or journal face 20, which as shown in Figure 7 is the full width of the shoe, except for two series of spaced beveled edges 21 at the opposite sides of the bushing. In assembling the parts the bushing is first slipped into the bearing hole of the shoe and then the intermediate bearing section 10 is placed in position, thus mounting the bushing between the front bearing bead 17 and the rear bearing face 14. Inasmuch as the square hole 19' of the bushing is larger than the square area of the rod, it will be apparent that this loose engagement of the bushing with the rod will permit the rod and the bushing to be thrust backward, slightly, under pressure, so that the revolving journal face 20 has a more direct contact with bearing face 14 than with the bearing bead 17 of the shoe and therefore greater wear occurs on the face 14 than on the bead 17.

Between the beveled edges 21 of the two series of edges of the bushing occur retaining flanges 22 preferably having flared inner faces 23, and these flanges in co-action with the shoe and its removable section retain the bushing in proper position against lateral displacement from the shoe.

As indicated in Figures 1 and 2 the shoe presents a minimum area of obstruction or resistance as it is forced through the soil, and the formation of the front of the shoe on a compound curve tends to hold the shoe under the surface of the soil as the shoe passes through the sub-soil.

The lip 9 of the shoe has a shovel effect on the soil which materially aids in retaining the shoe and rod in the sub-soil, and directly back of the lip the nose of the shovel is narrowed to a sharpened bridge-formation as 9' which directs the soil laterally and downwardly in order that compacting of the soil at the bearing may be avoided and thus eliminate, materially, friction of the soil with the bearing.

Since the forward movement of the shoe and rod has a tendency to push the rod and its bushing backwardly against the removable bearing section, and since the square bore of the bushing provides a loose fit on the rod, there is a slight play of the rod in the bushing, and this slight play of rod tends to hold the annular journal face of the bushing against the bearing face 14, at the rear of the bushing. The bushing is thus permitted to "work" as it revolves in its bearing with the rod and any soil that might enter openings about the bushing is continuously loosened, and not packed, or permitted to remain in the bearing.

The retaining flanges 22 co-act with the sides of the bearing member 10 to prevent lateral displacement of the bushing and the flanges also guide the movement of the revolving bushing with relation to the bearing bead 17 and face 7 of the shoe.

It will be noted that the width of the annular journal face of the bushing is materially reduced between the adjoining cut out or curved beveled edges 21, and the soil thus may be quickly dislodged, to the right and left through these cut out parts, as the bushing turns toward the upper lug 15 of the section 10. The outwardly flaring faces 15' of the lug then guide the soil outwardly to prevent access of the soil to the bearing at the rear of the bushing.

Because of the squared bore of the bushing, its weakest points would occur at the corners or near the corners of the bore, and therefore the outwardly projecting flanges 22 are located at these corner points for the purpose of strengthening the annular wall of the bushing.

Because of the fact that there is comparatively little frictional wear between the bushing and the bearing bead 17 or the front bearing face 17 of the shoe, a wide bearing face on the shoe is not required, and therefore the soil may be "worked" out at the sides of the bead through the spaces indicated in Figure 7 and through the scallops or cut out parts 21 of the bushing.

As most of the wear is directed against the removable bearing section 10, this part may readily be removed and replaced when worn, and at comparatively slight expense.

The comparatively loose fit of the parts of the bearing assembly permit ready adjustment and alinement of parts to meet varying conditions as the rod and bushing revolve, and the freedom of movement of the parts is effective in preventing clogging or binding of the soil, especially sticky clay, or damp soil.

While the rod has been shown as square in cross section, it will be understood that other angular shapes may be used for the rod and a complementary shape for the inner bore of the bushing.

As thus illustrated and described it will be apparent that I have provided for a freely revolving rod in this type of implement which eliminates materially the friction of parts, as well as packing, binding, or clogging of the parts, thus permitting the rod to be dragged or forced through the soil with a minimum application of power and maximum efficiency of the implement.

Having thus fully described my invention, what I claim as new and desire to secure by Letters Patent is:—

1. The combination with a shoe and its removable member having bearing faces, of a rotary bushing loosely journaled between said faces, a series of spaced retaining flanges at each side of the bushing, and an angular rod having a loose fit within the bushing.

2. The combination with a shoe and a removable member having front and rear bearing faces, of a rotary bushing loosely journaled between said faces, a series of spaced retaining flanges at each side of the bushing, said bushing having cut-away edges between adjoining flanges, and an angular rod having a loose fit within the bushing.

3. The combination with a shoe having a front bearing face a removable bearing member having a rear bearing face, said latter face terminating in an upper lug and outwardly flared sides to said lug, of a rotary bushing loosely journaled between said faces, a series of spaced retaining flanges at each side of the bushing, said bushing having cut-away edges between adjoining flanges, and an angular rod having a loose fit within the bushing.

4. The combination with a shoe having a front face and a comparatively narrow bearing bead on said face, a removable bearing member having a rear bearing face, said latter face terminating in an upper lug, and outwardly flared sides to said lug, of a rotary bushing loosely journaled between said bearing members, a series of spaced retaining flanges at opposite sides of the bushing, said bushing having cut-away edges between adjoining flanges, and an angular rod having a loose fit within the bushing.

5. The combination with a shoe having suitable bearings therein, of a rotary bushing loosely journaled in the bearing members and having a series of spaced retaining flanges at opposite sides of the bushing, said bushing having cut away edges between adjoining flanges.

6. A rotary bushing having a central squared opening, an annular exterior bearing surface, a series of spaced retaining flanges at opposite sides of the bushing, and cut away edges between adjoining flanges.

In testimony whereof I affix my signature.

CLAUDE C. CALKINS.